(12) United States Patent
Fukui et al.

(10) Patent No.: US 8,037,513 B2
(45) Date of Patent: Oct. 11, 2011

(54) IMAGE PROCESSING SYSTEM INCLUDING PLURALITY OF IMAGE PROCESSING APPARATUSES USED BY PLURALITY OF USERS, IMAGE PROCESSING APPARATUS INCLUDED IN THE IMAGE PROCESSING SYSTEM

(75) Inventors: Kazuyuki Fukui, Toyohashi (JP); Mikio Masui, Kobe (JP); Hiroyuki Ozawa, Kawasaki (JP); Shuichiro Kaneko, Yokohama (JP); Norihisa Takayama, Kobe (JP); Yoshikazu Ikenoue, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 924 days.

(21) Appl. No.: 11/679,649

(22) Filed: Feb. 27, 2007

(65) Prior Publication Data

US 2007/0214508 A1 Sep. 13, 2007

(30) Foreign Application Priority Data

Mar. 10, 2006 (JP) ................................ 2006-066805

(51) Int. Cl.
*H04L 9/32* (2006.01)

(52) U.S. Cl. ......................................................... 726/4
(58) Field of Classification Search .................. 707/3, 5, 707/10, 100; 358/1.13, 1.15; 726/4, 28, 726/32; 710/8
See application file for complete search history.

(56) References Cited

U.S. PATENT DOCUMENTS

| | | | |
|---|---|---|---|
| 6,246,487 | B1 | 6/2001 | Kobayashi et al. |
| 6,378,070 | B1 | 4/2002 | Chan et al. |
| 6,978,299 | B1 | 12/2005 | Lodwick |
| 2004/0162854 | A1* | 8/2004 | Maruta et al. .............. 707/104.1 |
| 2006/0015734 | A1* | 1/2006 | Atobe ........................... 713/176 |
| 2006/0023254 | A1 | 2/2006 | Hikichi |
| 2006/0274360 | A1 | 12/2006 | Fukui et al. |

FOREIGN PATENT DOCUMENTS

| | | |
|---|---|---|
| EP | 1 120 701 A1 | 8/2001 |
| JP | 06-062146 A | 3/1994 |
| JP | 10-042114 A | 2/1998 |

(Continued)

OTHER PUBLICATIONS

Notification of Ground of Rejection in JP 2006-066805 dated Jul. 1, 2008, and English Translation thereof.

(Continued)

*Primary Examiner* — Ellen Tran
(74) *Attorney, Agent, or Firm* — Buchanan Ingersoll & Rooney PC

(57) ABSTRACT

When a new MFP is connected in a state where a plurality of MFPs are connected to a network, each of a plurality of MFPs obtains an IP address of MPF from the new MFP, and if user data including the obtained IP address is stored, then transmits to the new MFP the registered user information associated with the obtained IP address by the user data. On the other hand, if user data including the obtained IP address is not stored in HDD, the new MFP is requested to transmit registered user information. Upon reception of the registered user information, the new MFP displays a confirmation window to ask the user for permission to write that registered user information into HDD. Upon reception of the request, the new MFP transmits registered user information. This facilitates the setting for newly connecting an apparatus to the network.

17 Claims, 10 Drawing Sheets

FOREIGN PATENT DOCUMENTS

| | | |
|---|---|---|
| JP | 11-184777 A | 7/1999 |
| JP | 2000-224368 A | 8/2000 |
| JP | 2001-249929 A | 9/2001 |
| JP | 2001-306204 A | 11/2001 |
| JP | 2001-326656 | 11/2001 |
| JP | 2002-016739 | 1/2002 |
| JP | 2004-005577 | 1/2004 |
| JP | 2004-015629 A | 1/2004 |
| JP | 2004-185423 A | 7/2004 |
| JP | 2005-020223 A | 1/2005 |
| JP | 2005-339106 | 12/2005 |
| JP | 2005-354405 | 12/2005 |
| JP | 2006-040061 | 2/2006 |

OTHER PUBLICATIONS

Notice of Ground of Rejection in JP 2005-161001 dated Jul. 14, 2009, and an English Translation thereof.

* cited by examiner

Fig. 4A
REGISTERED USER INFORMATION OF MFP 100

| NUMBER | USER IDENTIFICATION INFORMATION | PERSONAL INFORMATION | | | |
|---|---|---|---|---|---|
| | | ACCOMPANYING INFORMATION A | ADDRESS BOOK A | PANEL SETTING INFORMATION A | AUTHENTICATION INFORMATION A | HISTORY INFORMATION A |
| 1 | DAVID | | | | | |

Fig. 4B
REGISTERED USER INFORMATION OF MFP 100A

| NUMBER | USER IDENTIFICATION INFORMATION | PERSONAL INFORMATION | | | |
|---|---|---|---|---|---|
| | | ACCOMPANYING INFORMATION B | ADDRESS BOOK B | PANEL SETTING INFORMATION B | AUTHENTICATION INFORMATION B | HISTORY INFORMATION B |
| 2 | JULIE | | | | | |

Fig. 4C
REGISTERED USER INFORMATION OF MFP 100B

| NUMBER | USER IDENTIFICATION INFORMATION | PERSONAL INFORMATION | | | |
|---|---|---|---|---|---|
| | | ACCOMPANYING INFORMATION C | ADDRESS BOOK C | PANEL SETTING INFORMATION C | AUTHENTICATION INFORMATION C | HISTORY INFORMATION C |
| 3 | TED | | | | | |

Fig. 4D
REGISTERED USER INFORMATION OF MFP 100C

| NUMBER | USER IDENTIFICATION INFORMATION | PERSONAL INFORMATION | | | |
|---|---|---|---|---|---|
| | | ACCOMPANYING INFORMATION | ADDRESS BOOK | PANEL SETTING INFORMATION | AUTHENTICATION INFORMATION | HISTORY INFORMATION |
| 4 | MICHAEL | D | D | D | D | D |
| 5 | SUSAN | E | E | E | E | E |

Fig. 5
USER DATA

| NUMBER | USER IDENTIFICATION INFORMATION | PERSONAL INFORMATION ||||||  HOME TERMINAL |
|---|---|---|---|---|---|---|---|
| | | ACCOMPANYING INFORMATION | ADDRESS BOOK | PANEL SETTING INFORMATION | AUTHENTICATION INFORMATION | HISTORY INFORMATION | |
| 1 | DAVID | ACCOMPANYING INFORMATION A | ADDRESS BOOK A | PANEL SETTING INFORMATION A | AUTHENTICATION INFORMATION A | HISTORY INFORMATION A | IP ADDRESS OF MFP 100 |
| 2 | JULIE | ACCOMPANYING INFORMATION B | ADDRESS BOOK B | PANEL SETTING INFORMATION B | AUTHENTICATION INFORMATION B | HISTORY INFORMATION B | IP ADDRESS OF MFP 100A |
| 3 | TED | ACCOMPANYING INFORMATION C | ADDRESS BOOK C | PANEL SETTING INFORMATION C | AUTHENTICATION INFORMATION C | HISTORY INFORMATION C | IP ADDRESS OF MFP 100B |
| 4 | MICHAEL | ACCOMPANYING INFORMATION D | ADDRESS BOOK D | PANEL SETTING INFORMATION D | AUTHENTICATION INFORMATION D | HISTORY INFORMATION D | IP ADDRESS OF MFP 100C |
| 5 | SUSAN | ACCOMPANYING INFORMATION E | ADDRESS BOOK E | PANEL SETTING INFORMATION E | AUTHENTICATION INFORMATION E | HISTORY INFORMATION E | IP ADDRESS OF MFP 100C |

IMAGE PROCESSING SYSTEM INCLUDING PLURALITY OF IMAGE PROCESSING APPARATUSES USED BY PLURALITY OF USERS, IMAGE PROCESSING APPARATUS INCLUDED IN THE IMAGE PROCESSING SYSTEM

This application is based on Japanese Patent Application No. 2006-66805 filed with Japan Patent Office on Mar. 10, 2006, the entire content of which is hereby incorporated by reference.

BACKGROUND OF THE INVENTION

1. Field of the Invention

The present invention relates to an image processing system and an image processing apparatus, and more particularly to an image processing system in which a plurality of image processing apparatuses connected to a network are used by a plurality of users, and an image processing apparatus included in the image processing system.

2. Description of the Related Art

Recently, image processing apparatuses such as scanners, printers, and facsimiles are generally connected to a network. In order to use an image processing apparatus in this manner, a variety of settings for connecting to a network are required, and the operation is cumbersome. For example, in the case where an apparatus that has already been installed is to be replaced by a new apparatus, the new apparatus has to be set similarly to the installed apparatus. Japanese Laid-Open Patent Publication No. 2000-224368 discloses an image forming apparatus including a communication control portion communicating with a host apparatus via a telephone line to allow remote control from the host apparatus, a FAX control portion for facsimile transmission and reception, a data storage portion storing user setting information including a variety of information for use in facsimile transmission using the FAX control portion, and a main control portion transmitting the user setting information stored in the data storage portion to the host apparatus through the communication control portion for backup.

However, the image forming apparatus disclosed in Japanese Laid-Open Patent Publication No. 2000-224368 transmits the user setting information to the host apparatus for backup, so that a user has to give an instruction of a backup operation. In addition, in order to download the user setting information backed up in the host apparatus, the user has to instruct the image forming apparatus of an operation for downloading. Thus, the operation is cumbersome.

SUMMARY OF THE INVENTION

The present invention is therefore made in order to solve the aforementioned problem. An object of the present invention is to provide an image processing system in which the setting for connecting an apparatus to a network is easier.

Another object of the present invention is to provide an image processing apparatus in which the setting for connecting the apparatus to a network is easier.

In order to achieve the aforementioned object, in accordance with an aspect of the present invention, an image processing system includes a plurality of image processing apparatuses connected to a network. Each of the image processing apparatuses includes a registered user information storage portion to store registered user information including user identification information for identifying each user, an obtaining portion to obtain apparatus identification information for identifying a connected apparatus which is additionally connected to the network, a user data storage portion to store user data including the registered user information stored in the registered user information storage portion and apparatus identification information for identifying the image processing apparatus, which stores the registered user information, in association with each other, a determining portion to determine whether user data including the obtained apparatus identification information is stored in the user data storage portion or not, a transmitting portion to transmit the registered user information associated with the obtained apparatus identification information and the user data to the connected apparatus, when the determining portion determines that the user data including the obtained apparatus identification information is stored in the user data storage portion, and a registered user information requesting portion to request transmission of the registered user information from the connected apparatus, when the determining portion determines that the user data including the obtained apparatus identification information is not stored in the user data storage portion. The connected apparatus includes a storage portion to store registered user information, a receiving portion to receive the registered user information from one of the image processing apparatuses, a requesting portion to request allowance for storing the received registered user information into the storage portion, when the receiving portion receives the registered user information, and a registered user information transmitting portion to transmit the registered user information stored in the storage portion to the image processing apparatus, which requests transmission of the registered user information, in response to the request.

In accordance with another aspect of the present invention, an image processing system includes a plurality of image processing apparatuses connected to a network. Each of the image processing apparatuses includes a registered user information storage portion to store registered user information including user identification information for identifying each user, and an obtaining portion to obtain apparatus identification information for identifying a connected apparatus which is additionally connected to the network. The image processing system further includes a user data storage portion to store user data including the registered user information stored in the registered user information storage portion and apparatus identification information for identifying the image processing apparatus, which stores the registered user information, in association with each other. The image processing apparatus further includes a determining portion to determine whether user data including the obtained apparatus identification information is stored in the user data storage portion or not, a transmitting portion to transmit the registered user information associated with the obtained apparatus identification information and the user data to the connected apparatus, when the determining portion determines that the user data including the obtained apparatus identification information is stored in the user data storage portion, and a registered user information requesting portion to request transmission of the registered user information to the connected apparatus, when the determining portion determines that the user data including the obtained apparatus identification information is not stored in the user data storage portion. The connected apparatus includes a storage portion to store registered user information, a receiving portion to receive the registered user information from one of the image processing apparatuses, a requesting portion to request allowance for storing the received registered user information to the storage portion, when the receiving portion receives the registered user information, and a registered user information transmitting portion to transmit the registered user information stored in the storage portion to the image processing apparatus, which requests transmission of the registered user information, in response to the request.

In accordance with a further aspect of the present invention, an image processing system includes a plurality of image processing apparatuses connected to a network. Each of the image processing apparatuses includes a registered user information storage portion to store registered user information including user identification information for identifying each user, an obtaining portion to obtain apparatus identification information for identifying a connected apparatus which is additionally connected to the network, a user data storage portion to store user data including the registered user information stored in the registered user information storage portion and apparatus identification information for identifying the image processing apparatus, which stores the registered user information, in association with each other, a determining portion to determine whether user data including the obtained apparatus identification information is stored in the user data storage portion or not, a transmitting portion to transmit the registered user information associated with the obtained apparatus identification information and the user data to the connected apparatus, when the determining portion determines that the user data including the obtained apparatus identification information is stored in the user data storage portion, and a registered user information requesting portion to request transmission of the registered user information to the connected apparatus, when the determining portion determines that the user data including the obtained apparatus identification information is not stored in the user data storage portion. The connected apparatus includes a storage portion to store registered user information, a receiving portion to receive the registered user information from one of the image processing apparatuses, a registration portion to store the received registered user information to the storage portion, when the receiving portion receives the registered user information, and a registered user information transmitting portion to transmit the registered user information stored in the storage portion to the image processing apparatus, which requests transmission of the registered user information, in response to the request.

In accordance with yet another aspect of the present invention, an image processing system includes a plurality of image processing apparatuses connected to a network. Each of the image processing apparatuses includes a registered user information storage portion to store registered user information including user identification information for identifying each user, and an obtaining portion to obtain apparatus identification information for identifying a connected apparatus which is additionally connected to the network. The image processing system further includes a user data storage portion to store user data including the registered user information stored in the registered user information storage portion and apparatus identification information for identifying the image processing apparatus, which stores the registered user information, in association with each other. The image processing apparatus further includes a determining portion to determine whether user data including the obtained apparatus identification information is stored in the user data storage portion or not, a transmitting portion to transmit the registered user information associated with the obtained apparatus identification information and the user data to the connected apparatus, when the determining portion determines that the user data including the obtained apparatus identification information is stored in the user data storage portion, and a registered user information requesting portion to request transmission of the registered user information to the connected apparatus, when the determining portion determines that the user data including the obtained apparatus identification information is not stored in the user data storage portion. The connected apparatus includes a storage portion to store registered user information, a receiving portion to receive the registered user information from one of the image processing apparatuses, a registration portion to store the received registered user information to the storage portion, when the receiving portion receives the registered user information, and a registered user information transmitting portion to transmit the registered user information stored in the storage portion to the image processing apparatus, which requests transmission of the registered user information, in response to the request.

In accordance with these aspects, it is possible to provide an image processing system in which the setting for connecting an apparatus to a network is easier.

In accordance with a still further aspect of the present invention, an image processing apparatus, which is one of a plurality of image processing apparatuses connected to a network, includes: a registered user information storage portion to store registered user information including user identification information for identifying each user; an obtaining portion to obtain apparatus identification information for identifying a connected apparatus which is additionally connected to the network; a user data storage portion to store user data including the registered user information stored in the registered user information storage portion and apparatus identification information for identifying the image processing apparatus, which stores the registered user information, in association with each other; a determining portion to determine whether user data including the obtained apparatus identification information is stored in the user data storage portion or not; a transmitting portion to transmit the registered user information associated with the obtained apparatus identification information and the user data to the connected apparatus, when the determining portion determines that the user data including the obtained apparatus identification information is stored in the user data storage portion; a registered user information requesting portion to request transmission of the registered user information to the connected apparatus, when the determining portion determines that the user data including the obtained apparatus identification information is not stored in the user data storage portion; a receiving portion to receive registered user information stored in the connected apparatus from the connected apparatus; and an additionally registration portion to additionally store user data associated with the received registered user information and the apparatus identification information of the connected apparatus in response to reception of the registered user information.

In accordance with another aspect of the present invention, an image processing apparatus additionally connected to a network, in which a plurality of image processing apparatuses are connected, includes: an apparatus identification information input acceptance portion to accept an input of apparatus identification information for identifying the image processing apparatus; a registration request portion to transmit a registration request including the accepted apparatus identification information to one of the image processing apparatuses in the network; a storage portion to store registered user information; a receiving portion to receive registered user information corresponding to the accepted apparatus identification information from one of the image processing apparatuses in the network; a requesting portion to request allowance for storing the received registered user information to the storage portion, when the receiving portion receives the registered user information; and a registered user information transmitting portion to transmit the registered user information stored in the storage portion to one of the image processing apparatuses, which requests transmission of the registered user information, in response to reception of the request from the image processing apparatus.

In accordance with a further aspect of the present invention, an image processing apparatus additionally connected to a network, in which a plurality of image processing apparatuses are connected, includes: an apparatus identification information input acceptance portion to accept an input of apparatus identification information for identifying the image processing apparatus; a registration request portion to transmit a registration request including the accepted apparatus identification information to one of the image processing apparatuses in the network; a storage portion to store registered user information; a receiving portion to receive registered user information corresponding to the accepted apparatus identification information from one of the image processing apparatuses in the network; a registration portion to store the received registered user information to the storage portion, when the receiving portion receives the registered user information; and a registered user information transmitting portion to transmit the registered user information stored in the storage portion to one of the image processing apparatuses, which requests transmission of the registered user information, in response to reception of the request from the image processing apparatus.

In accordance with these aspects, it is possible to provide an image processing apparatus in which the setting for connecting an apparatus to a network is easier.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4A shows exemplary registered user information stored in MFP 100.

FIG. 4B shows exemplary registered user information stored in MFP 100A.

FIG. 4C shows exemplary registered user information stored in MFP 100B.

FIG. 4D shows exemplary registered user information stored in MFP 100C.

FIG. 5 shows exemplary user data.

DESCRIPTION OF THE PREFERRED EMBODIMENTS

Figure 1:
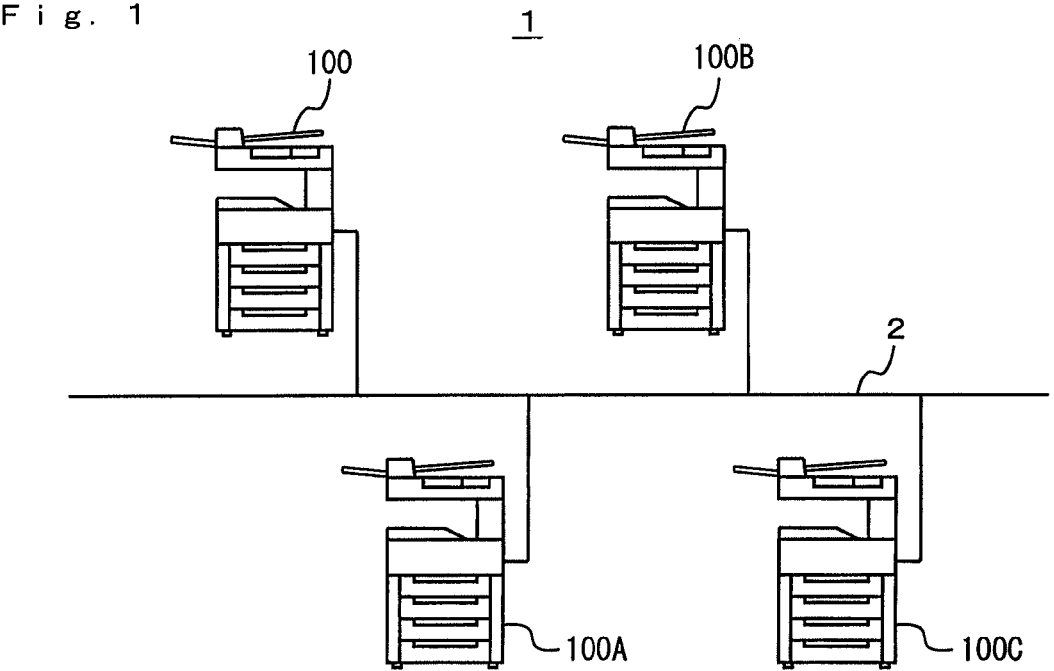
FIG. 1 is an overall schematic diagram showing an image processing system in an embodiment of the present invention.

The embodiment of the present invention will be described below with reference to the drawings. In the following description, the same or corresponding parts are denoted by the same reference characters. Their names and function are also the same. Thus, a detailed description thereof will not be repeated.

FIG. 1 is an overall schematic diagram showing an image processing system according to an embodiment of the present invention. With reference to FIG. 1, an image processing system 1 includes multi function peripherals (referred to as "MFP" below) 100, 100A, 100B, and 100C, each connected to a network 2. The configuration and the function of MFP 100, 100A, 100B, and 100C are the same, and therefore MFP 100 will be described here as an example unless otherwise noted.

MFP (Multi Function Peripheral) 100 includes a scanner for scanning a sheet of original manuscript, an image forming portion for forming an image on recording media such as a sheet of paper based on image data, and a facsimile, and has an image scanning function, a copying function, and a facsimile transmission and reception function. Moreover, although MFP 100 is described as an example in this embodiment, MFP 100 can be replaced by, for instance, a scanner, a printer, a facsimile, a personal computer, and the like.

Network 2 is a local area network (LAN) and the form of connection can be fixed-line or wireless. In addition, network 2 is not limited to a LAN and can be a wide area network (WAN), the Internet, and so on.

Figure 2:
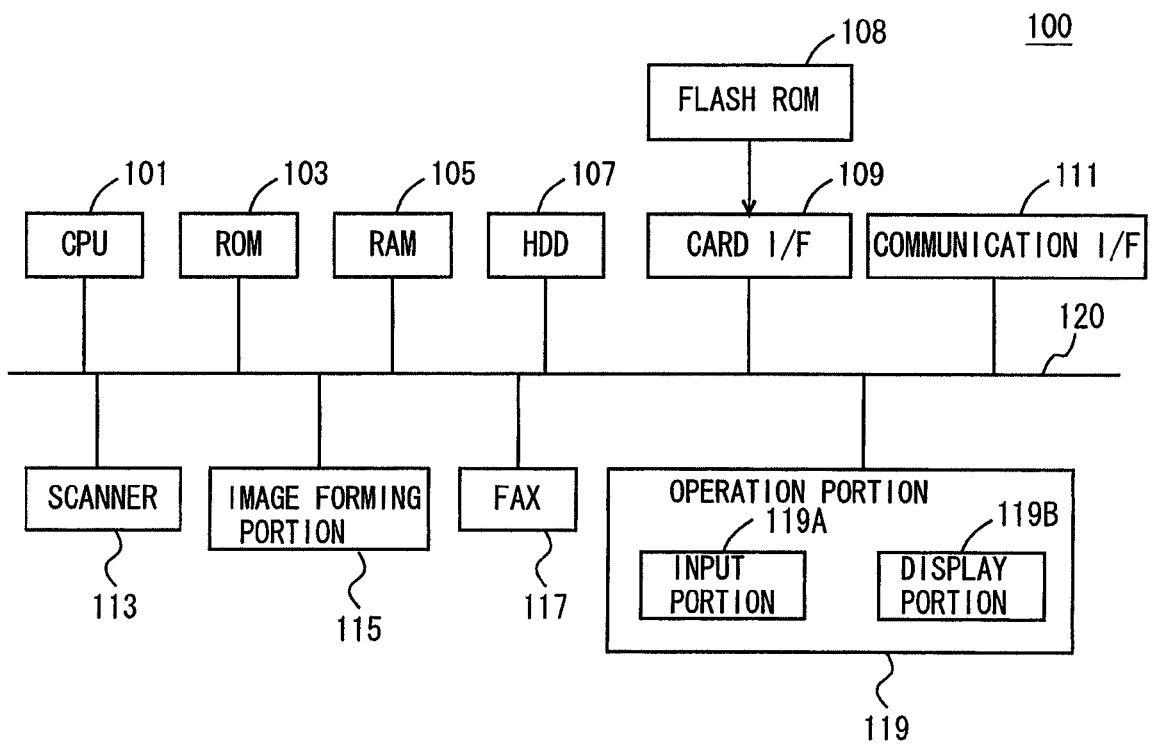
FIG. 2 is a block diagram showing an exemplary hardware configuration of MFP 100 in the present embodiment.

FIG. 2 is a block diagram showing an exemplary hardware configuration of MFP 100 according to this embodiment. With reference to FIG. 2, MFP 100 includes, each connected to a bus 120, a central processing unit (CPU) 101, a ROM (Read Only Memory) 103 that stores a program or the like to be executed by CPU 101, a RAM (Random Access Memory) 105 for loading a program to be executed and for storing data during execution of the program, a hard disk drive (HDD) 107 for storing data in a nonvolatile manner, a card interface (I/F) 109 to which a flash ROM 108 is attached, a communication I/F 111 for connecting MFP 100 to network 2, a scanner 113, an image forming portion 115, a facsimile (FAX) 117, and an operation portion 119 as an interface with a user.

CPU 101 loads into RAM 105 and executes a terminal registration program stored in flash ROM 108 attached to card I/F 109. Moreover, the program executed by CPU 101 is not limited to the terminal registration program stored in flash ROM 108, and a program stored in an EEPROM (Electrically Erasable/Programmable Read Only Memory) connected additionally to CPU 101 can be loaded into RAM 105 and be executed. The use of an EEPROM makes it possible to rewrite or additionally write a terminal registration program. Thus, another computer connected to network 2 can rewrite the terminal registration program stored in the EEPROM of MFP 100 or additionally write a new terminal registration program into the EEPROM. Furthermore, MFP 100 can download a terminal registration program from another computer connected to network 2 and store the terminal registration program in an EEPROM.

Moreover, these programs may not always be read from flash ROM 108 for execution. The program stored in ROM 103 may be read. A program read from flash ROM 108 can be stored in an EEPROM connected to CPU 101 and that program can then be read and executed. Furthermore, by saving a terminal registration program stored in the flash ROM into HDD 107 first, the program can be loaded from HDD 107 into RAM 105 and be executed.

The program referred to here not only includes a program directly executable by CPU 101, but also a source program, a compressed program, an encrypted program, and the like.

Image forming portion 115 is a laser printer, an ink jet printer, or the like, and makes image data visible on recording media such as a sheet of paper. Scanner 113 includes a photoelectric transducer such as a CCD (Charge Coupled Device) and the like, and optically reads a sheet of original manuscript and outputs electronic data that is the image data. FAX 117 transmits and receives the image data according to the facsimile protocol via Public Switched Telephone Network (PSTN).

Operation portion 119 includes an input portion 119A and a display portion 119B. Input portion 119A is an input device such as a touch panel, a keyboard, or a mouse for accepting an input of operation by a user of MFP 100. Display portion 119B is a liquid crystal display or an organic EL (Electro-Luminescence) display panel. When using a touch panel formed of a transparent member for input portion 119A, the touch panel is provided to overlap display portion 119B so that an instruction to a button displayed on display portion 119B can be detected. Thus, input of a variety of operations can be accepted.

Communication I/F 111 is a communication interface for connecting MFP 100 to network 2. MFP 100 can communicate with other MFPs 100A, 100B, 100C. Although MFP 100 is connected to other MFPs 10A, 100B, and 100C via network 2, it can also be connected directly using a serial interface or a parallel interface. Communication I/F 111 uses an interface that corresponds to the form of connection between MFP 100 and other MFPs 100A, 100B, and 100C.

The input of data into MFP 100 includes the following cases: (1) when scanner 113 scans a sheet of original manuscript and the image data is input; (2) when image data is received from another computer or from other MFPs 100A, 100B, and 100C connected to network 2 via communication I/F; (3) when image data stored in flash ROM 108 is read via card I/F; and (4) when facsimile data is received in FAX 117.

The output of data from MFP 100 includes the following cases: (1) data is made visible on recording media such as a sheet of paper by image forming portion 115; (2) data is transmitted to another computer or to other MFPs 100A, 100B, and 100C connected to the network via communication I/F 111; (3) data is stored in flash ROM 108; (4) data is transmitted as facsimile data by FAX 117; and (5) data is displayed on display portion 119B.

Moreover, a storage medium that stores a terminal registration program is not limited to flash ROM 108 and can also be media such as a flexible disk, a cassette tape, an optical disk (MO (Magnetic Optical Disc)/MD (Mini Disc)/DVD (Digital Versatile Disc)), an IC card (including a memory card), an optical card, and a semiconductor memory such as a mask ROM, an EPROM, an EEPROM.

In image processing system 1 according to this embodiment, for each of MFPs 100, 100A, 100B, and 100C, a user who mainly uses the apparatus is fixed. Thus, each of MFPs 100, 100A, 100B, and 100C stores registered user information in order to register the user who mainly uses it. The registered user information, which will be described later, includes at least user identification information for identifying a user. The name of the user can be used as the user identification information. Here, based on the user, any one or more of MFPs 100, 100A, 100B, and 100C which store the registered user information of that user are referred to as "home terminals." For instance, if the registered user information of the user "David" is stored in MFP 100, a home terminal of the user "David" is MFP 100. Moreover, registered user information is stored in each of MFPs 100, 100A, 100B, and 100C to define a user who mainly uses the apparatus but not to prohibit the user whose registered user information is not stored therein from using it.

Here, it is assumed that MFP 100 is newly connected to network 2 where MFPs 100A, 100B, and 100C have already been connected thereto. MFP 100 is connected to the network in the following cases: (1) when a new MFP 100 is connected to network 2; (2) MFP 100 which has been connected to a network different from network 2 is connected to network 2; and (3) when MFP 100 is replaced by a new apparatus. Here, connection of MFP 100 to network 2 includes that incorporation of MFP 100 into the group consisted of MFPs 100A, 100B, 100C.

First, a description will be made of (1) when a new MFP 100 is connected to network 2. In this case, registered user information is not stored in MFP 100. The apparatus identification information for identifying MFP 100 and the aforementioned registered user information have to be set in MFP 100.

Figure 3A:
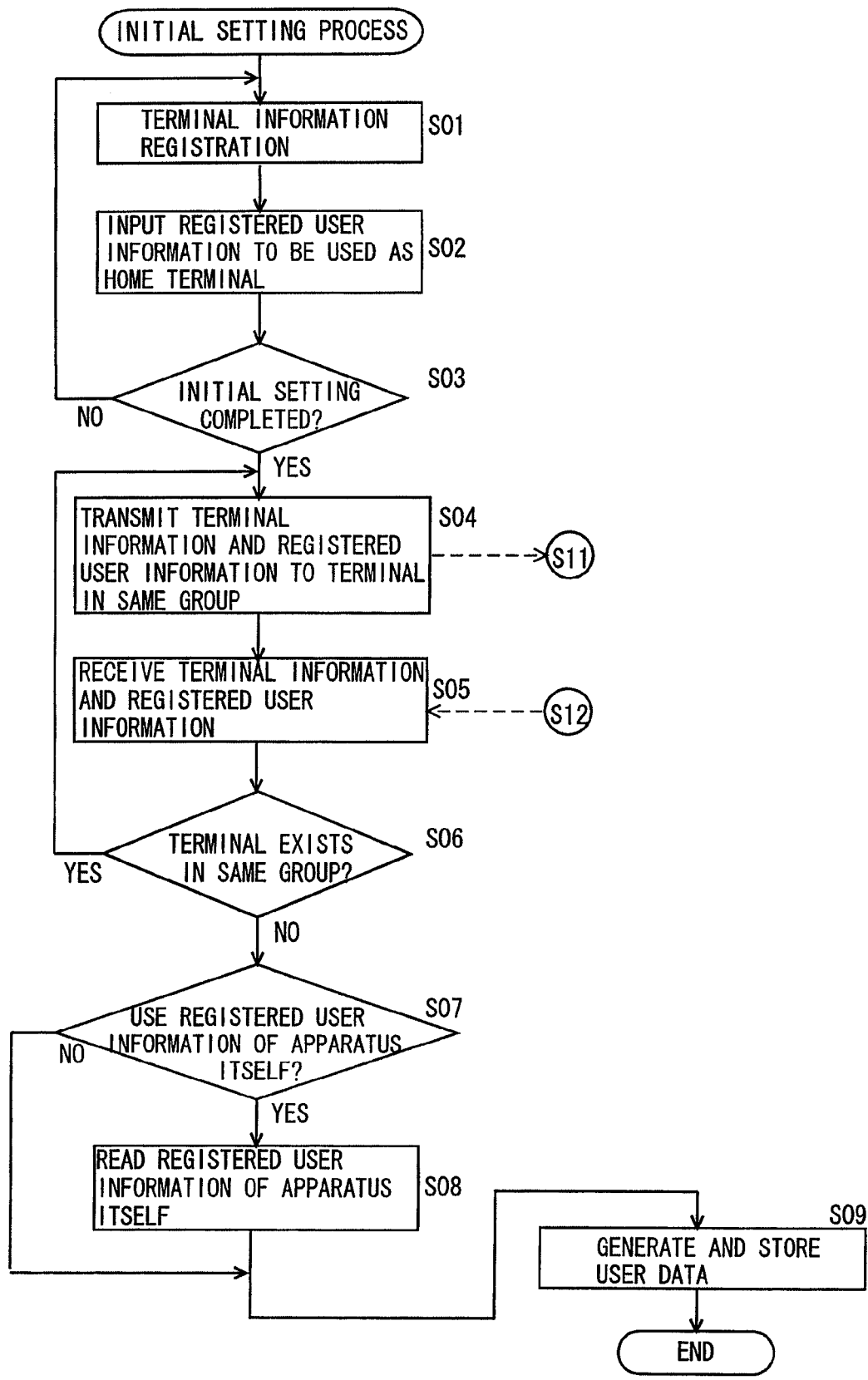
FIG. 3A is a flowchart illustrating an exemplary flow of an initial setting process.
Figure 3B:
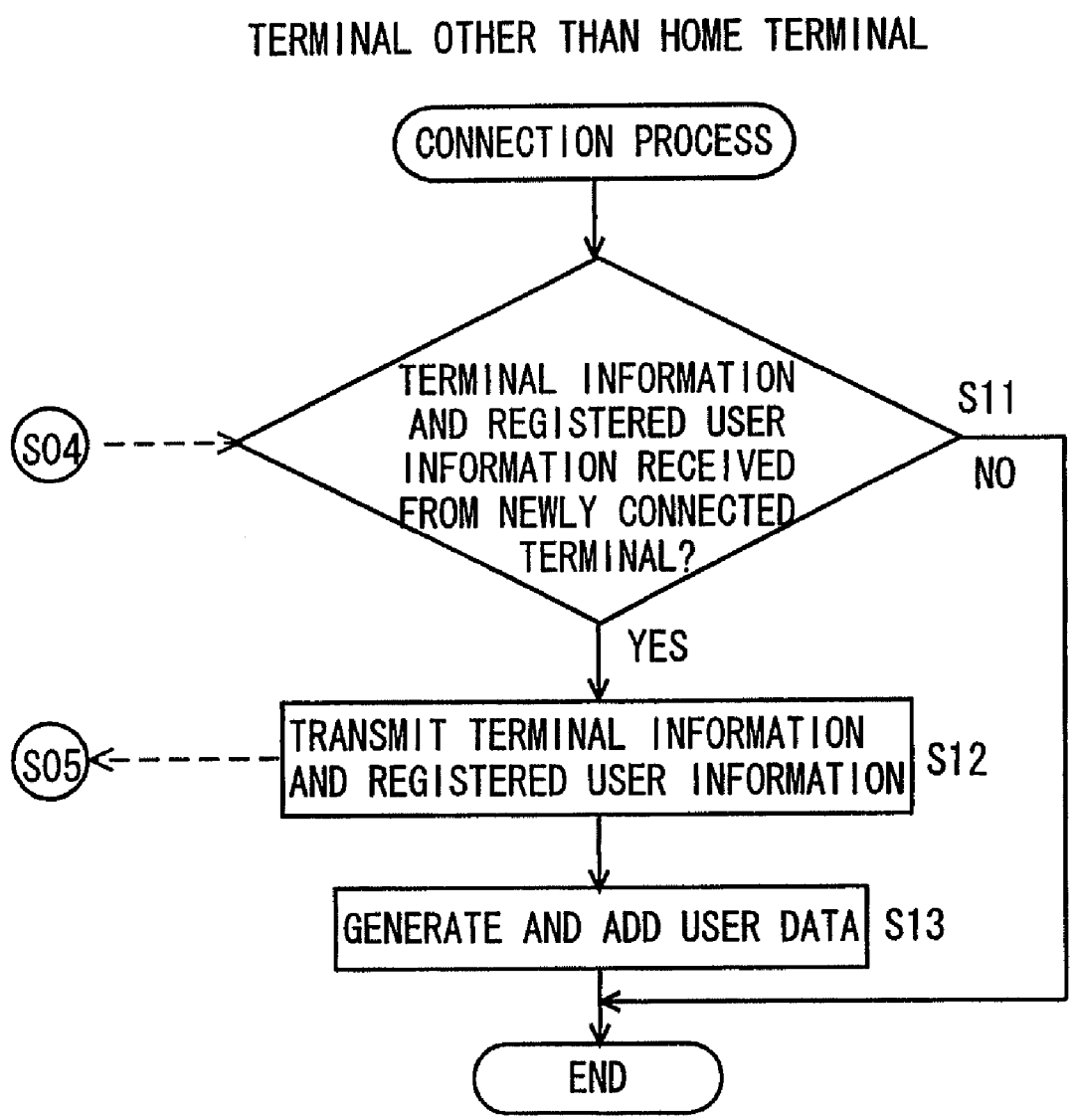
FIG. 3B is a flowchart illustrating an exemplary flow of a connection process.

FIG. 3A is a flowchart illustrating an exemplary flow of an initial setting process. The initial setting process is executed in MFP 100 when MFP 100 is newly connected to the network. FIG. 3B is a flowchart illustrating an exemplary flow of a connection process. The connection process is executed in each of MFPs 100A, 100B, and 100C when MFP 100 is newly connected to network 2. The initial setting process and the connection process are implemented by having an initial setting program and a connection program that are stored in flash ROM 108 loaded into RAM 105 and executed by CPU 101, in each of MFPs 100, 100A, 100B, and 100C. The initial setting program and the connection program are part of a data transmission/reception program.

With reference to FIG. 3A, terminal information is registered in MFP 100 (step S01). The terminal information is accepted by MFP 100 and registered by the user inputting the terminal information to operation portion 119 according to a terminal registration window appearing on display portion 119B. The terminal information at least includes apparatus identification information for identifying MFP 100. The apparatus identification information is preferably location information assigned to MFP 100 in network 2, and is here an IP (Internet Protocol) address. The terminal information can include information showing the location where MFP 100 is disposed. At step S01, the terminal information is preferably registered by an administrator of the terminal.

Then, the registered user information of the user who uses MFP 100 as a home terminal is input to MFP 100 (step S02). According to a registered user information input window appearing on display portion 119B, the user inputs the registered user information to operation portion 119, so that the registered user information is accepted by MFP 100. If a plurality of users use MFP 100 as home terminals, the respective registered user information of a plurality of users are input. The registered user information at least includes user identification information for identifying a user. The user identification information may be unique information such as a user ID formed of characters or symbols or a user's name. Here, the user's name is used as user identification information. The registered user information may include accompanying information and authentication information in addition to the user identification information.

The user inputs the terminal information, and upon completion of the user registration process, the user gives an instruction to input portion 119A on a completion button displayed on display portion 119B, so that it is detected in MFP 100 that the initial setting has been completed. The registration of the terminal information at step S01 and the input of registered user information at step S02 are usually performed by the administrator of the terminal.

Then, it is determined whether the initial setting is completed or not (step S03). If the initial setting is completed, the process proceeds to step S04, and if it is not completed, the process goes back to step S01. At step S04, the terminal information and the registered user information for which initial setting has already been performed are transmitted to the terminals in the same group. The same group refers to a set of terminals which form image processing system 1. Here, MFPs 100, 100A, 100B, and 100C connected to network 2 are considered to be of the same group. Thus, by transmitting an inquiry by broadcast on network 2, MFP 100 receives the IP addresses of terminals respectively transmitted back from MFPs 100A, 100B, and 100C in the same group in response to the inquiry. In this manner, the IP addresses of the terminals that form the same group are obtained. Moreover, by grouping, a plurality of terminals connected to network 2 can be divided into different groups. For instance, MFPs 100 and 100A can form one group, while MFPs 100B and 100C can form another group. Such grouping is set by a user. More specifically, as described above, MFP 100 receives the respective IP addresses of MFPs 100A, 100B, and 100C connected to network 2 and detects MFPs 100A, 100B, and 100C, and the user designates which of MFPs 100A, 100B, and 100C should be in the same group as MFP 100, whereby an apparatus to be included in the group is specified.

MFP 100 transmits terminal information and user identification information to one terminal chosen from MFPs 100A, 100B, and 100C set as the same group. Here, MFP 100A is selected, and the terminal information and the user identification information of MFP 100 are transmitted from MFP 100 to MFP 100A, by way of example.

Now, with reference to FIG. 3B, MFP 100A receives the terminal information and the registered user information of MFP 100 transmitted from MFP 100 (step S11). In response to this reception, MFP 100A transmits to MFP 100 the registered user information and the terminal information stored in HDD 107 of MFP 100A (step S12). In other words, the connection process is a process performed on condition that a request is received from MFP 100 which performs the initial setting process. In the next step S13, user data is generated based on the terminal information and the registered user information of MFP 100 received at step S11, and the generated user data is added to user data already stored in HDD 107.

Going back to FIG. 3A, MFP 100 receives the terminal information and the registered user information of MFP 100A transmitted from MFP 100A (step S05). Then, it is determined whether or not a terminal to which the terminal information and the registered user information have not yet been transmitted exists among the terminals of the same group (step S06). If such a terminal exists, that terminal is selected and the process goes back to step S04, but if not, the process proceeds to step S07. Here, since the terminal information and the user identification information have not yet been transmitted to MFPs 100B and 100C, either of these two is selected and the process goes back to step S04. Thus, MFP 100 transmits the terminal information and the registered user information of MFP 100 to the terminals of the same group one by one (step S04), and receives from each terminal the terminal information and the registered user information of that terminal (step S05). Moreover, although, here, the terminals of the same group are selected one by one and the terminal information and the registered user information are transmitted accordingly, the terminal information and the registered user information can be transmitted by broadcast, and the terminal information and the registered user information stored in MFPs 100A, 100B, and 100C can be received from MFPs 100A, 100B, and 100C, respectively.

At step S07, it is determined whether or not the registered user information of the apparatus itself is to be used for the user data generation. This determination can be based on a selection made by a user, or it can be predetermined. If it is determined that the registered user information of the apparatus itself is to be used, the process proceeds to step S08, and if it is determined that it is not to be used, step S08 is skipped and the process proceeds to step S09. At step S08, the registered user information stored in MFP 100 is read. Then, at step S09, the user data is generated from the terminal information and the registered user information. If step S08 is skipped, user data is generated from the registered user information and the terminal information received from each of terminal MFPs 100A, 100B, 100C. If step S08 is executed, user data is generated from the registered user information received from each of MFPs 100A, 100B, 100C and the registered user information stored in MFP 100 and the terminal information of each of MFPs 100, 100A, 100B, 100C. The user data includes terminal information and registered user information. Here, although in the present embodiment the user data includes terminal information and registered user information, the user data may include at least registered user information. Here, the user data generated when MFP 100 determines that the registered user information of its own is used at step S07 is referred to as first user data, and the user data generated when MFP 100 determines that the registered user information of its own is not used at step S07 is referred to as second user data. Then, the generated user data is stored in HDD 107.

When the first user data is generated in all of MFPs 100, 100A, 100B, 100C, all of MFPs 100, 100A, 100B, 100C have the same user data. On the other hand, in the case where MFP 100A generates the second user data, the second user data includes user data in which the terminal information of MFPs 100, 100B, 100C and the registered user information stored in MFPs 100, 100B, 100C are respectively associated with each other. In the case where MFP 100B generates the second user data, the second user data includes user data in which the terminal information of MFPs 100, 100A, 100C and the registered user information stored in MFPs 100, 100A, 100C are respectively associated with each other. In the case where MFP 100C generates the second user data, the second user data includes user data in which the terminal information of MFPs 100, 100A, 100B and the registered user information stored in MFPs 100, 100A, 100B are respectively associated with each other.

Moreover, here, while the terminal information registration process and the registered user information input process are performed in the initial setting process executed in MFP 100, a process similar to this initial setting process is executed in the case where MFP 100 has already been connected to network 2 and a user is to be added. In such a case, however, the terminal information registration process at step S01 is not required.

In addition, the initial setting process can be performed not only when each of MFPs 100, 100A, 100B, and 100C is connected to network 2 but also after the power is turned on in each of MFPs 100, 100A, 100B, and 100C, or at prescribed time intervals. Alternatively, an operation switch for initiating the initial setting process may be provided to operation portion 119 or the like so that the initial setting process may be initiated in response to the user's operation. This is applicable to the connection process in each of MFPs 100A, 100B, 100C. For example, if a new user is registered in MFP 100, the registered user information of the newly registered user is transmitted to other MFPs 100A, 100B, 100C so that the latest user data is stored in other MFPs 100A, 100B, 100C. In this case, MFP 100 does not perform step S01 and step S03 in the initial setting process shown in FIG. 3A and executes the registered user information input process at step S02.

Conversely, MFP 100 obtains the registered user information of a user newly registered in any of other MFPs 100A, 100B, 100C and stores the latest user data in MFP 100. In this case, MFP 100 executes a process of requesting other MFPs 100A, 100B, 100C to transmit the registered user information without executing the processes at step 01-step 03 in the initial setting process shown in FIG. 3A. This transmission request for the registered user information at least includes apparatus identification information. In response to this transmission request, each of other MFPs 100A, 100B, 100C performs the connection process shown in FIG. 3B and at step S11, in response to the received transmission request, transmits the registered user information stored in its own HDD 107 to MFP 100 which transmitted the transmission request. Therefore, even when the registered user information stored in HDD 107 of other MFPs 100A, 100B, 100C is changed, user data is generated and stored in HDD 107, based on the changed registered user information. In this case, each of MFPs 100A, 100B, 100C need not perform step S13 in the connection process.

FIG. 4A is a diagram showing an example of registered user information stored in MFP 100, FIG. 4B is a diagram showing an example of registered user information stored in MFP 100A, FIG. 4C is a diagram showing an example of registered user information stored in MFP 100B, and FIG. 4D is a diagram showing an example of registered user information stored in MFP 100C.

Referring to FIGS. 4A-4D, the registered user information includes a number, user identification information, and personal information. The personal information includes accompanying information, an address book, panel setting information, authentication information, and history information. The accompanying information is the information unique to a user, such as the name of the division the user belongs to, an email address assigned to that user, face image data obtained by capturing the face of that user, and so on. The address book is information registered by the user, including information of senders that the user can communicate with, for example, user identification information, an email address, a facsimile number of the user as a transmission destination. The panel setting information is information of the display content on screen individually set by the user. The authentication information is the information used for authentication of the user at log-in, and here, a password is used. It is also possible to use the face image data as the authentication information. When biometrics authentication is used, a fingerprint, sound spectrogram, iris, vein pattern, and the like are used for authentication information. The history information is data generated when the user instructs each of MFPs 100, 100A, 100B, 100C to execute a process, and includes the content of the instruction and the process result. The content of the instruction includes, if it is an instruction of an email transmission process, indication of email transmission, a transmission destination and transmission contents.

FIG. 5 is a diagram showing an example of user data. This user data is generated in each of MFPs 100, 100A, 100B, 100C and stored therein by MFP 100 executing the initial setting process shown in FIG. 3A and each of MFPs 100A, 100B, 100C executing the connection process shown in FIG. 3B. Referring to FIG. 5, the user data includes user identification information, personal information, and apparatus identification information for identifying the home terminal for the user.

In this manner, when the initial setting process is executed in MFP 100, in MFPs 100, 100A, 100B, and 100C set to be of the same group, the same user data is generated and stored. Thus, image processing system 1 constructed by MFPs 100, 100A, 100B, and 100C is formed. When image processing system 1 is formed, the user who uses one of MFPs 100, 100A, 100B, and 100C as a home terminal can be specified based on the user data. Therefore, when a user operates a terminal other than the home terminal using the user data, the personal information recorded in the home terminal can be taken in to that terminal.

A description will now be made of (2) a case where MFP 100 that has been connected to a network different from network 2 is connected to network 2 and (3) a case where MFP 100 is replaced by a new apparatus. In the case (2) where MFP 100 that has been connected to another network 2 is connected to network 2, registered user information has already been stored in MFP 100 that has been connected to another network 2. In the case (3) where MFP 100 is replaced by a new apparatus, registered user information is stored in MFP 100 before replacement that has been connected to network 2 while registered user information is not stored in an apparatus that will be newly connected to the network (referred to as "MFP 100 after replacement").

Figure 6:
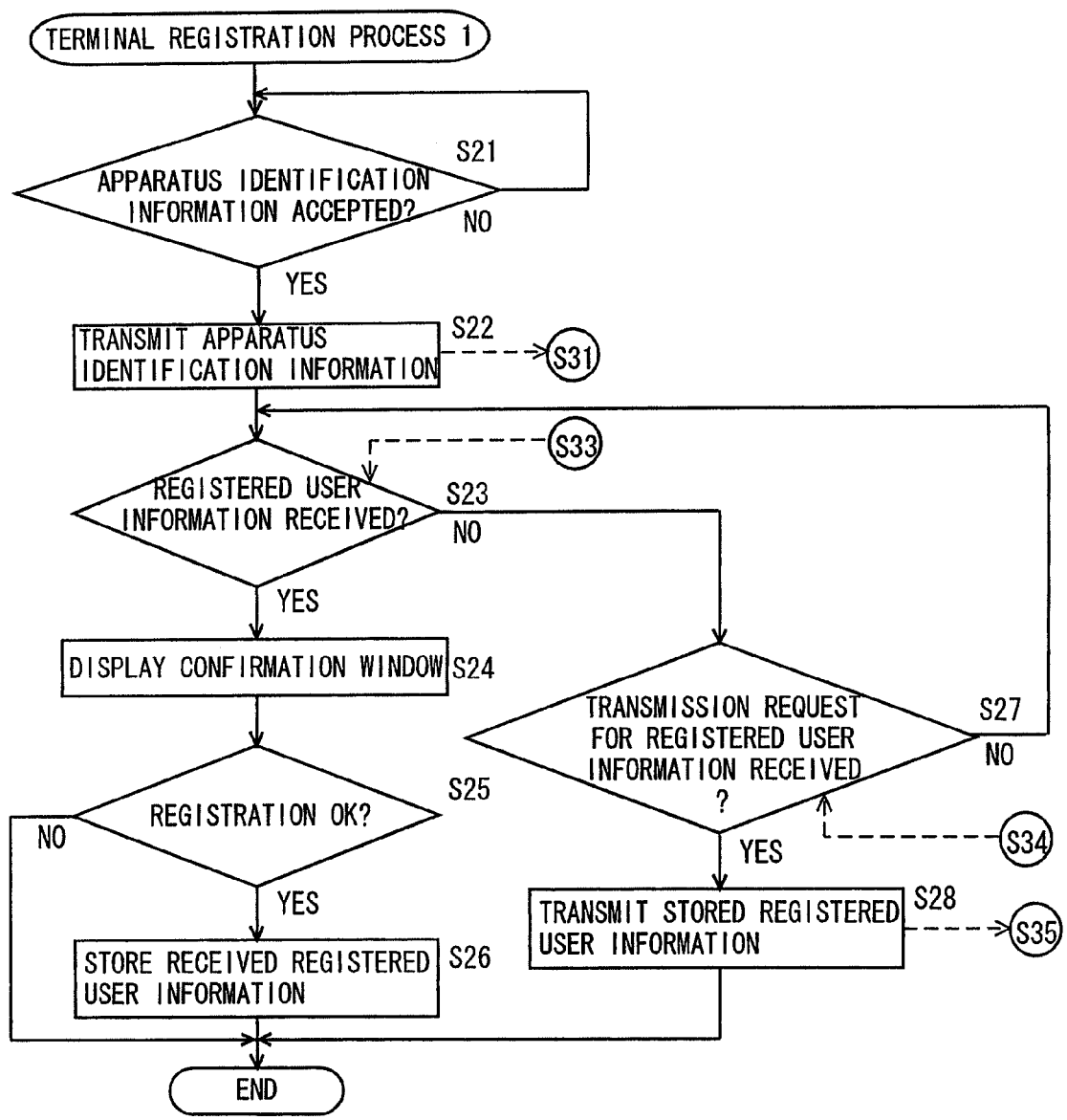
FIG. 6 is a first flowchart illustrating an exemplary flow of a terminal registration process.
Figure 7:
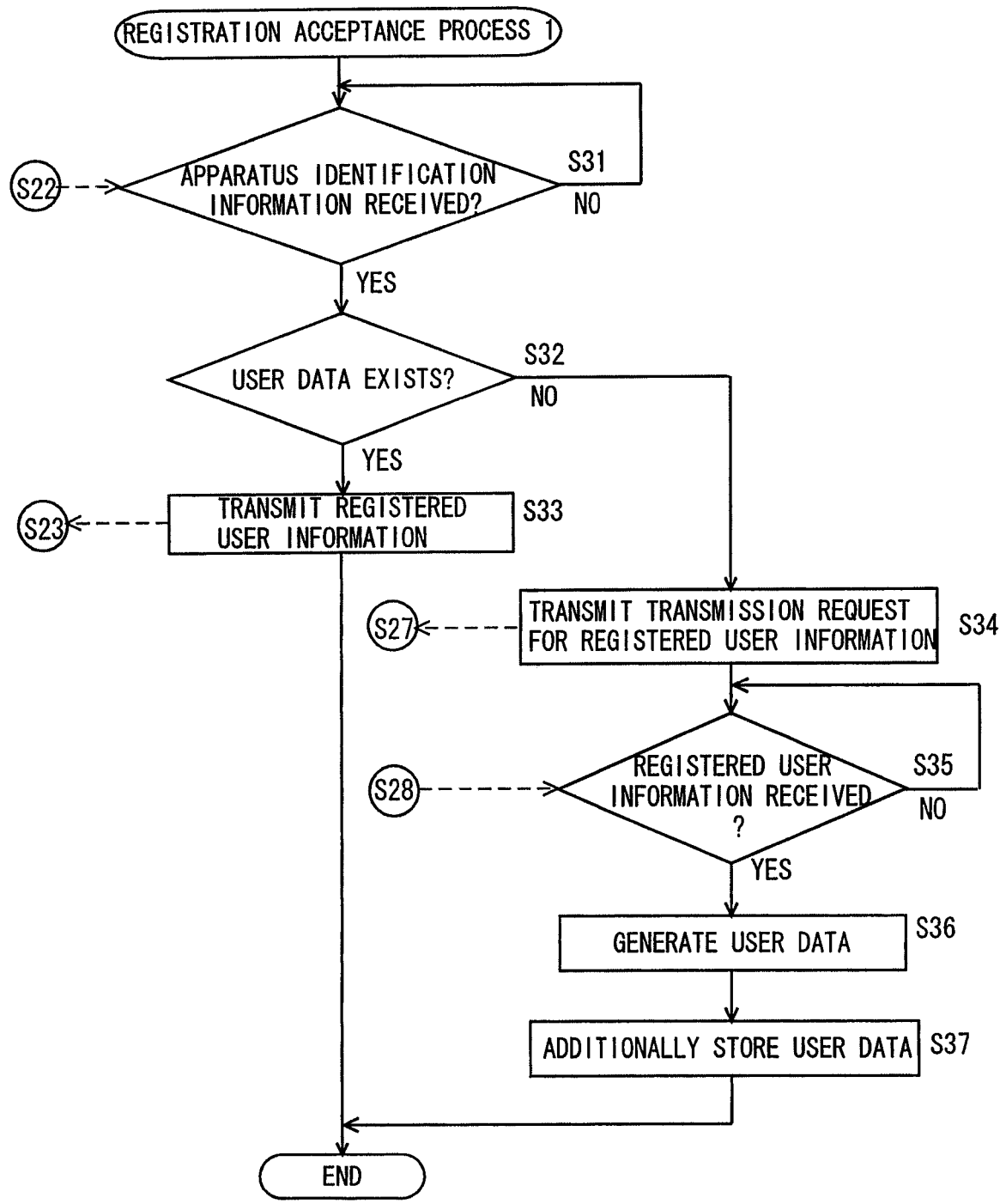
FIG. 7 is a first flowchart illustrating an exemplary flow of a registration acceptance process.

FIG. 6 is a first flowchart illustrating an exemplary flow of a terminal registration process. This terminal registration process is a process performed at MFP 100 that will be newly connected to the network. FIG. 7 is a first flowchart illustrating an exemplary flow of a registration acceptance process. This registration acceptance process is a process performed at each of MFPs 100A, 100B, 100C when the terminal registration process is performed at MFP 100. Referring to FIG. 6 and FIG. 7, MFP 100 determines whether or not apparatus identification information is accepted (step S21). Here, an IP (Internet Protocol) address is used as apparatus identification information, by way of example. In the case (2) where MFP 100 which has been connected to a network different from network 2 is connected to network 2, a new IP address is assigned to MFP 100, and that IP address is input to input portion 119A of MFP 100 and is then accepted by MFP 100. In the case (3) where MFP 100 is replaced by a new MFP 100, the IP address assigned to MFP 100 before replacement is assigned to MFP 100 after replacement, and that IP address is input to input portion 119A of MFP 100 after replacement and is then accepted by MFP 100 after replacement. Here, at step S21, apparatus identification information is usually input by the administrator of the apparatus.

Next, MFP 100 transmits the accepted apparatus identification information to at least one of MFPs 100A, 100B, 100C which have already been connected to network 2 (step S22). The apparatus identification information may be transmitted to network 2 by broadcast or may be transmitted to any one of MFPs 100A, 100B, 100C. Here, the apparatus identification information is transmitted to MFP 100A, by way of example.

MFP 100A stands by until the apparatus identification information is received (step S31). When MFP 100A receives the apparatus identification information transmitted by MFP 100, the process proceeds to step S32. At step S32, it is determined whether or not user data exists which includes the apparatus identification information received at HDD 107 of MFP 100A. If user data including apparatus identification information is stored and such user data exists, the process proceeds to step S33. If not stored and such user data does not exist, the process proceeds to step S34. The process proceeds to step S33 in the case (3) where MFP 100 is replaced by a new MFP 100. The process proceeds to step S34 in the case (2) where MFP 100 that has been connected to a network different from network 2 is connected to network 2.

At step S33, MFP 100A transmits, to MFP 100 after change, registered user information included in the user data read from HDD 107, when it is determined that user data exists at step S32. The process then ends. Since MFP 100A has already stored the user data including the apparatus identification information of MFP 100A before change, the registered user information included in that user data is transmitted to MFP 100 after change so that the registered user information is stored in MFP 100 after change. On the other hand, at step S34, a transmission request for requesting MFP 100 to transmit the registered user information is transmitted. This is because MFP 100A does not store the registered user information stored in MFP 100.

MFP 100 determines whether or not the registered user information is received. If the registered user information is received, the process proceeds to step S24. If not received, the process proceeds to step S27. At step S27, it is determined whether or not the transmission request for the registered user information is received. If the transmission request for the registered user information is received, the process proceeds to step S28. If the transmission request for the registered user information is not received, the process returns to step S23. In other words, after MFP 100 transmits the apparatus identification information to MFP 100A at step S22, if MFP 100 receives the registered user information, the process after step S24 is performed, and if MFP 100 receives the transmission request for the registered user information, the process after step S28 is performed. MFP 100 reads the registered user information stored in HDD 107 for transmission to MFP 100A, at step S28.

At step S24, MFP 100 displays a confirmation window on display portion 119B. The confirmation window is a window for inquiring of the user whether or not the received registered user information may be stored in HDD 107 and accepting an input of an instruction to store the received registered user information in HDD 107 or an instruction not to store the same. If the user who watches the confirmation window inputs to input portion 119A the instruction to store the received registered user information into HDD 107, that instruction is accepted at MFP 100. If the user inputs the instruction not to store the received registered user information into HDD 107, that instruction is accepted at MFP 100. At step S25, MFP 100 determines whether or not the user is to be registered with the received registered user information. Specifically, it is determined which of the instruction to store the registered user information received at step S23 into HDD 107 and the instruction not to store is accepted. If the instruction to store the registered user information is accepted, the process proceeds to step S26. If the instruction not to store the registered user information is accepted, the process ends. At step S26, MFP 100 stores the registered user information received at step S23 into HDD 107, and the process then ends. If the registered user information has already been stored in HDD 107, that registered user information is deleted and the registered user information received at step S23 is stored. Here, of the registered user information received at step S23, the registered user information different from the registered user information that has already been stored in HDD 107 may be stored additionally to the already stored registered user information.

If the instruction not to store the registered user information is accepted, the registered user information received at step S23 is not stored into HDD 107. The reason is as follows. In the case (3) where MFP 100 is replaced by new MFP 100, in some cases, the user has stored the registered user information in MFP 100 after replacement, and in such a case, step S26 is not performed in order to give preference to the registered user information stored by the user.

MFP 100A stands by until the registered user information is received from MFP 100 (step S35). If the registered user information is received from MFP 100, the process proceeds to step S36. At step S36, new user data is generated from the apparatus identification information received at step S31 and the registered user information received at step S35 (step S36). The generated user data is stored additionally to the user data that has already been stored in HDD 107 (step S37).

When the terminal registration process is performed by MFP 100 after change, the registered user information stored by MFP 100 after change may sometimes be changed. Thereafter, when the initial setting process shown in FIG. 3A is performed by MFP 100 after change, user data is generated and stored by MFP 100 after change. Thus, MFP 100 after change can store the same user data as other MFPs 100A, 100B, 100C store.

Figure 8:
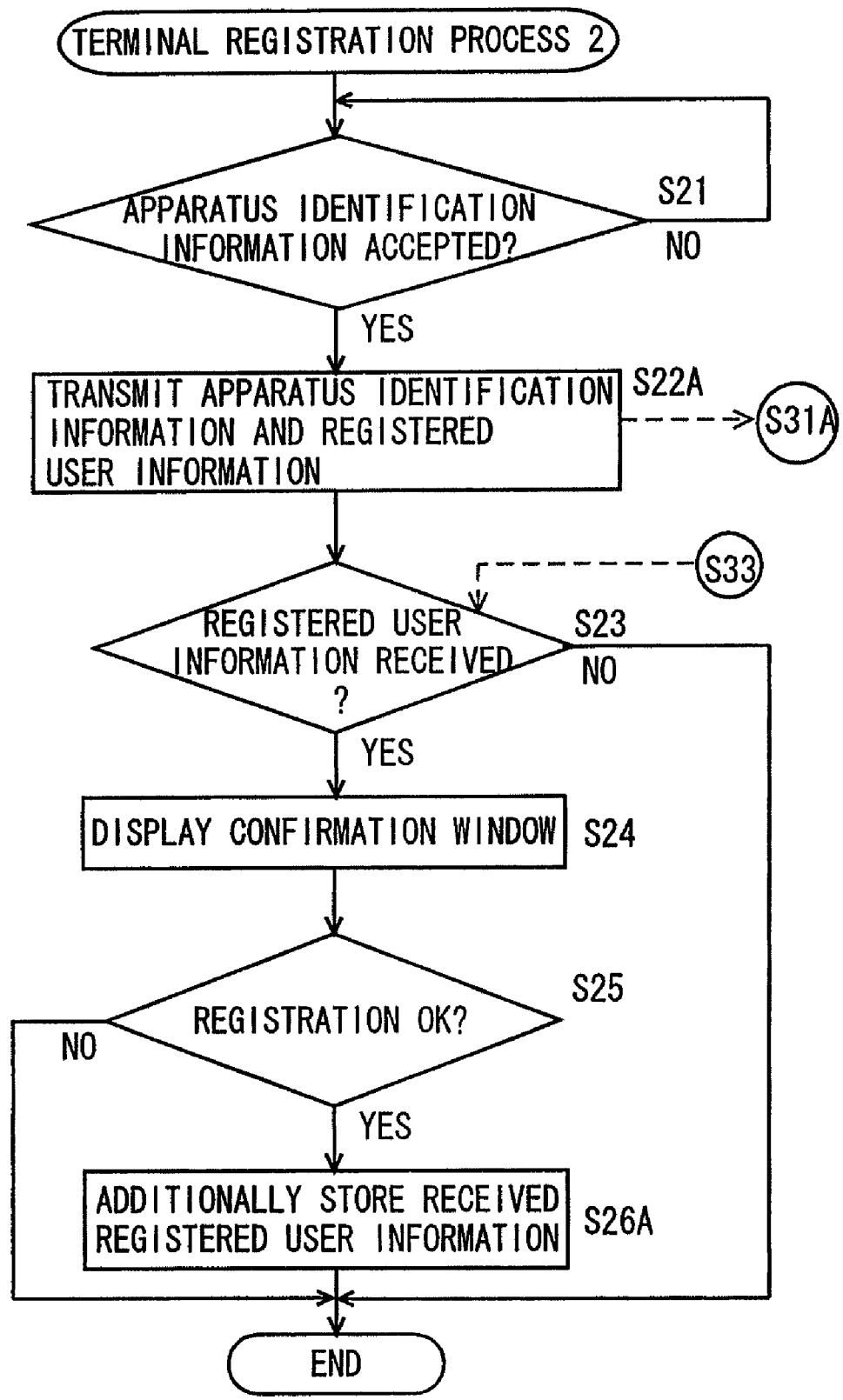
FIG. 8 is a second flowchart illustrating an exemplary flow of a terminal registration process.

FIG. 8 is a second flowchart illustrating an exemplary flow of a terminal registration process. This terminal registration process is a process performed by MFP 100 newly connected to the network. The same processes as those in the terminal registration process shown in FIG. 6 are denoted with the same reference characters. Referring to FIG. 8, when the apparatus identification information is accepted (YES at step S21), MFP 100 transmits the accepted apparatus identification information and the registered user information to at least one of MFPs 100A, 100B, 100C which have already been connected to network 2 (step S22). Here also, the apparatus identification information is transmitted to MFP 100A, by way of example. In the case (3) where MFP 100 is replaced by new MFP 100, the registered user information is not stored in HDD 107 of MFP 100. In this case, only the apparatus identification information is transmitted.

MFP 100 determines whether or not the registered user information is received (step S23). If the registered user information is received, the process proceeds to step S24, and if not received, the process ends. At step S24, the confirmation window appears on display portion 119B. At step S25, it is determined whether or not the user is to be registered with the received registered user information. At step S26A, MFP 100 additionally stores the registered user information received at step S23 into HDD 107, and the process then ends. If the registered user information has already been stored in HDD 107, the received registered user information is additionally stored without erasing the already stored registered user information.

Figure 9:
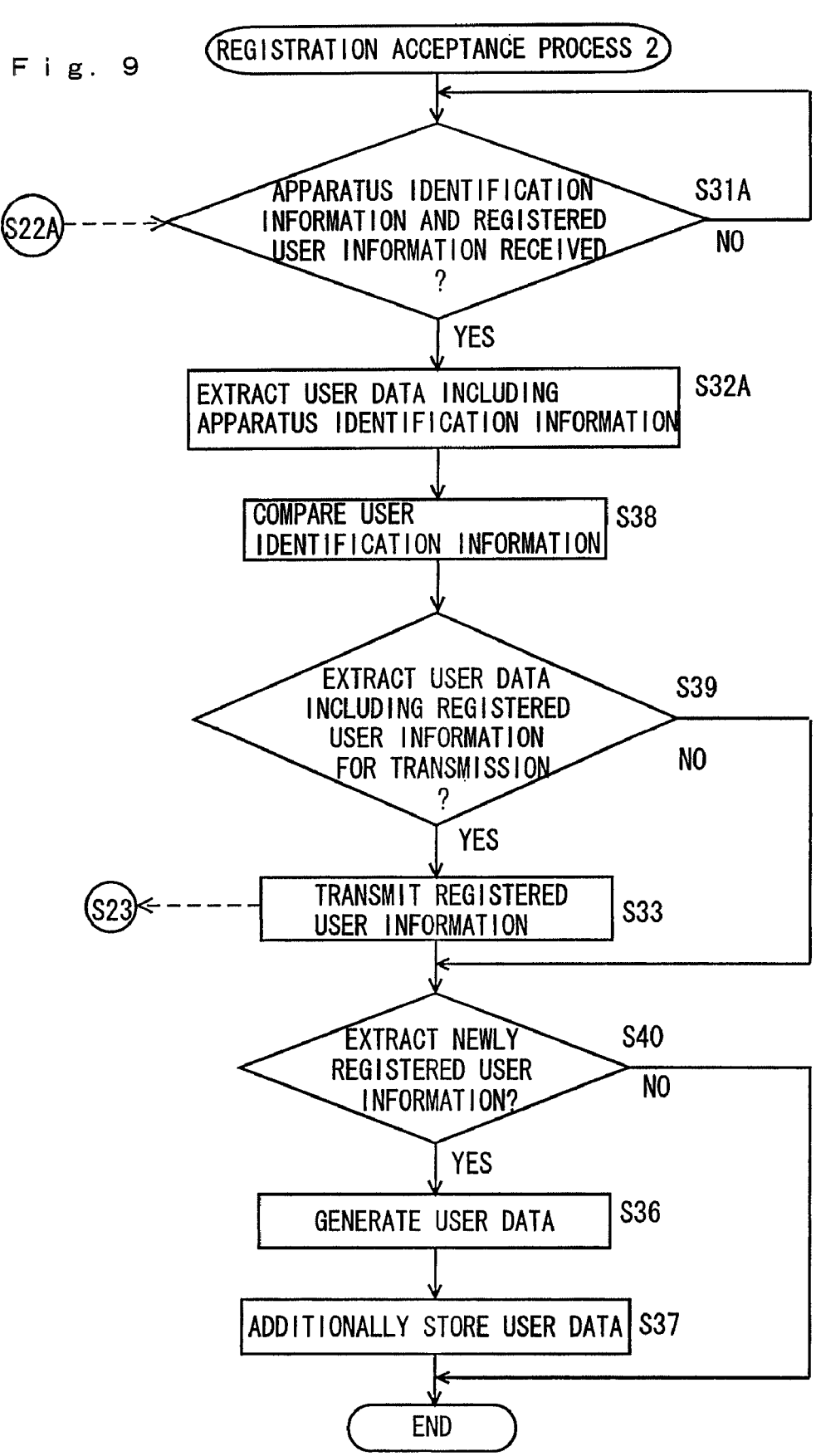
FIG. 9 is a second flowchart illustrating an exemplary flow of a registration acceptance process.

FIG. 9 is a second flowchart illustrating an exemplary flow of a registration acceptance process. This registration acceptance process is a process performed by each of MFPs 100A, 100B, 100C when the terminal registration process is performed by MFP 100. The same processes as those in the registration acceptance process shown in FIG. 7 are denoted with the same reference characters. Referring to FIG. 9, MFP 100A stands by until the apparatus identification information and the registered user information are received (step S31A). When the apparatus identification information and the registered user information transmitted by MFP 100 are received, the process proceeds to step S32A. Here, if only the apparatus identification information is received, the process also proceeds to step S32.

At step S32A, MFP 100A extracts user data including the received apparatus identification information from the user data stored in HDD 107 of MFP 100A. Then, the user identification information included in the extracted user data is compared with the user identification information included in the received registered user information (step S38). It is determined whether or not user data including registered user information for transmission is extracted, as a result of comparison (step S39). If user data including registered user information for transmission is extracted, the process proceeds to step S33. If such user data is not extracted, step S33 is skipped and the process proceeds to step S40. The registered user information for transmission is registered user information including user identification information which is not included in the registered user information received at step S31A but is included in the user data extracted at step S32A. The registered user information for transmission is extracted by extracting the user data including the user identification information which disagrees as a result of the comparison at step S38, from the user data extracted at step S32A. At step S33, the registered user information included in the user data for transmission extracted at step S39 is transmitted to MFP 100.

At step S40, MFP 100A determines whether or not newly registered user information is extracted using the result of the comparison at step S38. If newly registered user information is extracted, the process proceeds to step S36. If newly registered user information is not extracted, the process ends. The newly registered user information is registered user information including user identification information which is included in the registered user information received at step S31A but is not included in the user data extracted at step S32A. The newly registered user information is extracted by extracting the registered user information including the user identification information which disagrees in the comparison at step S38, from the registered user information received at step S31A. At step S36, new user data is generated from the apparatus identification information received at step S31 and the newly registered user information extracted at step S40. Then, the new user data is stored additionally to the user data that has already been stored in HDD 107 (step S37).

MFP 100 performs the terminal registration process and thereafter performs the initial setting process shown in FIG. 3A so that user data is stored in MFP 100 and other MFPs 100B, 100C store the same user data as MFPs 100, 100A store.

Here, in the example as described above, the terminal registration process shown in FIG. 6 and FIG. 8 and the terminal acceptance process shown in FIG. 7 and FIG. 9 are triggered by a user inputting the apparatus identification information into MFP 100. However, these processes may be triggered by detection that MFP 100 is physically connected to network 2, at the time when MFP 100 is physically connected to network 2. Alternatively, these processes may be triggered by that any of MFPs 100A, 100B, 100C, other than MFP 100, which have already been connected to network 2 detects that MFP 100 is connected to network 2. In this case, immediately before step S31, there is added a process in which, among MFPs 100A, 100B, 100C, MFP that detects that MFP 100 is connected to network 2 requests MFP 100 to transmit apparatus identification information. Alternatively, the aforementioned processes may be performed after each of MFPs 100, 100A, 100B, 100C is powered on, or may be performed at prescribed time intervals. Further, an operation switch for initiating the initial setting process may be provided to operation portion 119 or the like so that the initial setting process is initiated in response to the user's operation.

The user performs a log-in operation to operate any of MFPs 100, 100A, 100B, 100C. Specifically, the log-in operation is an operation of inputting user identification information. In the following, among MFPs 100, 100A, 100B, 100C, MFP on which a user performs a log-in operation is referred to as an operation terminal. Here, for the sake of brevity, the user of user identification information "Julie" performs a log-in operation on MFP 100, by way of example. In this case, MFP 100 is the operation terminal, and an operation input process is performed in MFP 100 as an operation terminal.

Figure 10:
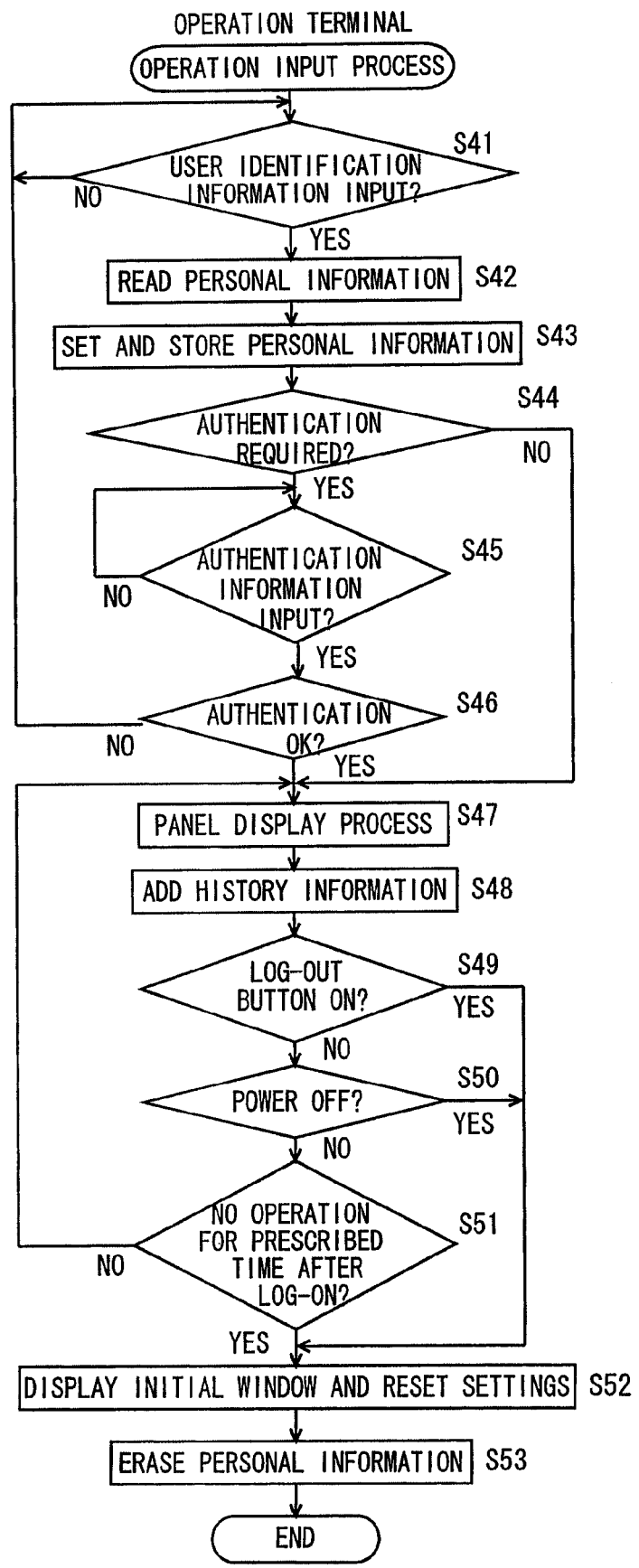
FIG. 10 is a flowchart illustrating an exemplary flow of an operation input process.

FIG. 10 is a flowchart illustrating an exemplary flow of an operation input process. The operation input process is implemented by the program stored in flash ROM 108 being loaded to RAM 105 of each of MFPs 100, 100A, 100B, 100C and being executed by each CPU 101. This program is part of the image processing program.

Referring to FIG. 10, MFP 100 as the operation terminal accepts an input of user identification information of the user "Julie" (step S41). The process stands by until user identification information is input (NO at step S41). If user identification information is input, the process proceeds to step S42. In other words, the operation terminal executes the process after step S42 on condition that user identification information is input. In the following, the user to whom the user identification information input at step S41 is assigned is referred to as a log-in user.

At step S42, the registered user information stored in HDD 107 of MFP 100 is searched, so that the personal information stored in relation with the user identification information input at step S41 is read. Thereafter, the process proceeds to step S43. At step S43, the personal information read at step S42 is stored in RAM 105 so that it is set as the personal information of the log-in user.

Then, it is determined whether or not user authentication is required (step S44). Whether or not user authentication is required may be set in each of MFPs 100, 100A, 100B, 100C, in advance. User authentication is usually set as being required. If user authentication is required, the process proceeds to step S45, and if not required, the process proceeds to step S47. In the case where log-in authentication is not required, the panel setting process described later is performed similarly to the case where a user logs in as a guest user.

Then, the user is prompted to input authentication information by means of screen display or voice output, and the process stands by until the authentication information is input (NO at step S45). If the authentication information is input, the process proceeds to step S46. At step S46, the authentication information input at step S45 is compared with the authentication information of the personal information stored in RAM 105. If both agree, it is determined that the authentication is established (authentication OK), execution of the following process is enabled and the process proceeds to step S47. If both do not agree, it is determined that the authentication is failed, and the process returns to step S41.

At step S47, the panel display process is performed based on the personal information of the log-in user. The personal information of the log-in user is the personal information stored in RAM 105 at step S43. In other words, the personal information is the personal information read from HDD 107 of MFP 100 at step S42.

Upon execution of the panel display process, a window appears on display portion 119B which is customized according to the panel setting information of the personal information. In the panel display process, the window is displayed according to the panel setting information, which is switched to the panel setting information of the personal information. For example, in a copy window, the copy window is displayed according to copy information of the panel setting information that is initially set, which is then switched to copy information included in the panel setting information of the personal information. The copy window is then displayed according to the switched copy information. The copy information includes, for example, a magnification "same size," number of copies "two," sort "effective, " and the like. Here, MFP 100 as the operation terminal may not have the function that MFP 100A as the home terminal has. For example, although MFP 100A is equipped with a sorter, MFP 100 may not be equipped with the same. Even when sort "effective" is displayed in the copy window, MFP 100 does not have a sorting function, and therefore the copy window is not consistent with the function executable in MFP 100. Thus, in the copy window, the function that cannot be performed by the operation terminal, among the information included in the panel setting information, is displayed in a manner different from the manner in which the functions that can be performed by the operation terminal are displayed, in order to indicate that the acceptance of the instruction thereof is impossible. The indication that the acceptance of the instruction is impossible is displayed, for example, with lower density as compared with the other display. It is noted that if the log-in user is a guest user, in the panel display process, the window is displayed according to the panel setting information by default.

In addition to the display of the copy window, the panel display process includes display of an address book, which is displayed when a transmission destination (the name, facsimile, email, network printer, file server, or groupware server of the user registered in other MFP) is designated. In the case where destination designation is designated in the panel display process, the address book of the personal information of the log-in user is read and displayed on display portion 119B.

When a command for causing MFP 100 to perform a process is accepted according to the window displayed on display portion 119B in the panel display process, MFP 100 performs the process according to that command and generates history information based on the execution result of the executed process. The history information includes the execution result of an error process. Then, the history information is added to the history information of the personal information stored in RAM 105 (step S48).

At the following step S49-step S51, it is determined whether or not an instruction to log out is given. If the instruction to log out is given, the process proceeds to step S52, and if the instruction is not given, the process returns to step S47. In other words, step S47-step S48 are repeatedly performed until the log-out instruction is given. The log-out instruction is given in a case (1) where a log-out button of input portion 119A is pressed, (2) where an instruction to power off MFP 100 as the operation terminal is input, or (3) where an operation is not input to input portion 119A for a prescribed period of time after log-on. Specifically, at step S49, if the log-out button is pressed, the process proceeds to step S52, and if not, the process proceeds to step S50. At step S50, if an instruction to power off is input, the process proceeds to step S52, and if not, the process proceeds to step S51. At step S51, if an operation is not input for a prescribed period of time after log-on, the process proceeds to step S52, and if not, the process returns to step S47.

It is noted that MFP 100 as the operation terminal does not immediately cut off the power but cut off the power at the end of the following step S52 and step S53, if the instruction to power off is input.

At step S52, the window to be displayed on display portion 119B is switched to the initial window, and the parameters (including the panel setting information) set for MFP 100 are all set to the initial values. Then, at step S53, the personal information stored in RAM 105 is erased. Thus, the personal information of the user who logged in before is not used for a user who logs in later.

Here, the personal information with history information added at step S48 may be transmitted together with the instruction to change the personal information to the home terminal. This change instruction includes the user identification information "Julie" of the log-in user and the changed personal information. Accordingly, if a user operates any of MFPs 100, 100A, 100B, 100C, the history of the operation can be stored in the home terminal.

Here, the personal information is erased from RAM 105 at step S53. However, the personal information may be temporarily stored in HDD 107 and the temporarily stored personal information may be read when the same user logs in again. The personal information temporarily stored in HDD 107 may be erased after a prescribed period of time. Thus, the personal information does not stay stored in an operation terminal other than the home terminal.

Here, in the present embodiment, the user data is stored in each of MFPs 100, 100A, 100B, 100C. However, the user data may be stored in a server connected to network 2. In this case, the connection process in FIG. 3B and the registration acceptance process in FIG. 7 and FIG. 9 are performed by the server so that MFPs 100, 100A, 100B, 100C receive the user data from the server.

As described above, each of MFPs 100, 100A, 100B, 100C stores in HDD 107 registered user information in which user identification information for identifying each of a plurality of users and personal information related with the user are related with each other. In the case where MFP 100 is changed to new MFP 100 (replaced by new MFP 100), the apparatus identification information of MFP 100 before change is set in MFP 100 after change and MFP 100 after change is connected to network 2 so that each of MFPs 100A, 100B, 100C obtains the IP address of MFP 100 before change from MFP 100 after change which is newly connected to network 2 (step S31). If user data including the obtained IP address is stored in HDD 107 (YES at step S32), registered user information associated with the obtained IP address by the user data is transmitted to MFP 100 after change (step S33). Therefore, connection of MFP 100 after change to network 2 causes the registered user information stored in MFP 100 before change to be stored in HDD 107 of MFP 100 after change.

Further, if MFP 100 after change receives the registered user information before the registered user information stored in MFP 100 before change is stored in HDD 107 of MFP 100 after change (step S33), a confirmation window appears for asking the user for permission to write that registered user information into HDD 107 (step S24). Thus, the user can determine by himself whether or not the registered user information stored in MFP 100 before change is to be written into HDD 107 of MFP 100 after change.

On the other hand, in the case where MFP 100 is newly connected where MFPs 100A, 100B, 100C are connected to the network, if user data including the obtained IP address is not stored in HDD 107 (NO at step S32), each of MFPs 100A, 100B, 100C requests MFP 100 to transmit the registered user information (step S34). In response to reception of the request to transmit the registered user information which is transmitted by any of MFPs 100A, 100B, 100C (YES at step S27), MFP 100 transmits the registered user information stored in HDD 107 to MFP that transmitted the transmission request (step S28). Therefore, the registered user information stored in HDD 107 of MFP 100 can be stored in MFPs 100A, 100B, 100C connected to network 2 for backup.

Here, in the foregoing embodiment, image processing system 1 has been described. However, the present invention can be understood as a terminal registration method and a terminal registration program performed by each of MFPs 100, 100A, 100B, 100C included in image processing system 1, as a matter of course.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing system comprising a plurality of image processing apparatuses connected to a network,
    wherein each of said image processing apparatuses comprises:
    a registered user information storage portion to store registered user information including authentication information for authenticating each user for whom the image processing apparatus in which the registered user information storage portion resides is a home terminal,
    an obtaining portion to obtain apparatus identification information for identifying an additionally connected apparatus which is additionally connected to the network,
    a user data storage portion to store user data including the registered user information stored in each of said plurality of image processing apparatuses and apparatus identification information for identifying the image processing apparatus in which the registered user information is stored, such that each of said plurality of image processing apparatuses have said user data in common,
    a determining portion to determine whether user data including the obtained apparatus identification information is stored in the user data storage portion or not,
    a transmitting portion to transmit the registered user information associated with the obtained apparatus identification information to the additionally connected apparatus, when the determining portion determines that the user data including the obtained apparatus identification information is stored in the user data storage portion, and
    a registered user information requesting portion to request transmission of the registered user information from the additionally connected apparatus, when the determining portion determines that the user data including the obtained apparatus identification information is not stored in the user data storage portion,
    an adding portion to, in response to reception of said registered user information transmitted by said additionally connected apparatus upon request from said transmitting portion, add to said user data storing portion for storing user data including said registered user information and apparatus identification information received from said additionally connected apparatus in association with each other, so as to have said user data in common among a group of said plurality of image processing apparatuses with said additionally connected apparatus,
    a registered user information generating portion to, in a case where said registered user information is received by said additionally connected apparatus from any one of the already connected apparatuses among said plurality of image processing apparatuses, have the additionally connected apparatus store the registered user information received by said additionally connected apparatus in the user data storage portion of the additionally connected apparatus, and
    a user data generating portion to, when the additionally connected apparatus acquires the registered user information stored in each of said plurality of image processing apparatuses, have the additionally connected apparatus store the registered user information in the user data storage portion of the additionally connected apparatus, together with the associated apparatus identification information for identifying the image processing apparatus associated with the registered user information, so that the additionally connected apparatus has said user data in common among the group of said plurality of image processing apparatuses.

2. The image processing system of claim 1, wherein the image processing apparatus further comprises
    a registered user information obtaining portion to obtain registered user information stored in the connected apparatus, and
    a comparing portion to compare authentication information in the registered user information obtained from the connected apparatus with the authentication information in the registered user information stored in the user data storage portion.

3. The image processing system of claim 1, wherein the connected apparatus further comprises
    an apparatus identification information input acceptance portion to accept an input of apparatus identification information for identifying the connected apparatus, and
    an apparatus identification information registration request portion to request registration of the apparatus identification information of the connected apparatus from any one of the image processing apparatuses.

4. The image processing system of claim 1, wherein the image processing apparatus further comprises a detecting portion to detect a connected apparatus which is additionally connected to the network.

5. The image processing system of claim 1, wherein the apparatus identification information is an IP address or a name of the apparatus.

6. The image processing system of claim 1, wherein the requesting portion includes a display portion to display a screen for allowance of storing the received registered user information to the storage portion.

7. The image processing system according to claim 1, wherein:
    said additionally connected apparatus further includes an allowance requesting portion to, in a case where said registered user information corresponding to the apparatus identification information for said additionally connected apparatus is received from any one of already connected apparatuses among said plurality of image processing apparatuses, request allowance for storing the received registered user information into the storage device.

8. The image processing system according to claim 2, wherein:
    each of said plurality of image processing apparatuses further includes a post-comparison adding portion to, in a case of disagreement in the authentication information for registered user information judged by said comparing portion, generate new user data including authentication information included in said acquired registered user information and said acquired apparatus identification information in association with each other, and additionally store the new user data in said user data storage portion, wherein said transmitting portion, in a case of agreement in the authentication information for registered user information judged by said comparing portion, transmits to said connected apparatus the registered user information stored in said user data storage portion, in association with the apparatus identification information for said connected apparatus.

9. The image processing system according to claim 1, wherein:

said additionally connected apparatus further includes an allowance accepting portion to, in a case where said registered user information corresponding to the apparatus identification information for said additionally connected apparatus is received from any one of already connected apparatuses among said plurality of image processing apparatuses, accept allowance for storing the received registered user information into the storage device; and said registered user information generating portion, on a condition that an allowance is accepted by said allowance accepting portion, stores said received registered user information into said storage device.

10. An image processing apparatus, which is one of a plurality of image processing apparatuses connected to a network, comprising:

a registered user information storage portion to store registered user information at least including authentication information for authenticating each user for whom the image processing apparatus is a home terminal;

an obtaining portion to obtain apparatus identification information for identifying an additionally connected apparatus which is additionally connected to the network;

a user data storage portion to store user data including the registered user information stored in each of said plurality of image processing apparatuses and apparatus identification information for identifying the image processing apparatus in which the registered user information is stored, such that each of said plurality of image processing apparatuses have said user data in common;

a determining portion to determine whether user data including the obtained apparatus identification information is stored in the user data storage portion or not;

a transmitting portion to transmit the registered user information associated with the obtained apparatus identification information to the additionally connected apparatus, when the determining portion determines that the user data including the obtained apparatus identification information is stored in the user data storage portion;

a registered user information requesting portion to request transmission of the registered user information to the additionally connected apparatus, when the determining portion determines that the user data including the obtained apparatus identification information is not stored in the user data storage portion;

an additional registration portion to, by additionally storing in said user data storage portion user data associated with the received registered user information and the apparatus identification information of the additionally connected apparatus in response to reception of the registered user information transmitted by said additionally connected apparatus upon request from said transmitting portion, have said user data in common among a group of said plurality of image processing apparatuses with said additionally connected apparatus added.

11. The image processing apparatus of claim 10, further comprising:

a registered user information obtaining portion to obtain registered user information stored in the connected apparatus; and a comparing portion to compare authentication information in the registered user information obtained from the connected apparatus with the authentication information in the registered user information stored in the user data storage portion.

12. The image processing apparatus of claim 10, further comprising a detecting portion to detect a connected apparatus which is additionally connected to the network.

13. The image processing system according to claim 11, further including a post-comparison adding portion to, in a case of disagreement in the authentication information for registered user information judged by said comparing portion, generate new user data including authentication information included in said acquired registered user information and said acquired apparatus identification information in association with each other, and additionally store to said user data storage portion, wherein said transmitting portion, in a case of agreement in the authentication information for registered user information judged by said comparing portion, transmits to said additionally connected apparatus the registered user information stored in said data storage portion, in association with the apparatus identification information for said connected apparatus.

14. An image processing apparatus additionally connected to a network, in which a plurality of image processing apparatuses are connected, wherein:

each of said plurality of image processing apparatuses includes:

a registered user information storage portion to store registered user information at least including authentication information for authenticating each user for whom the image processing apparatus in which the registered user information storage portion resides is a home terminal and a user data storage portion to store user data including the registered user information stored in each of said plurality of image processing apparatuses and apparatus identification information for identifying the image processing apparatus in which the registered user information is stored, such that each of said plurality of image processing apparatuses have said user data in common; and said additionally connected image processing apparatus includes:

an apparatus identification information input acceptance portion to accept an input of apparatus identification information for identifying the image processing apparatus;

a registration request portion to transmit a registration request including the accepted apparatus identification information to one of the image processing apparatuses in the network;

a registered user information generating portion to, in a case where said registered user information is received by said additionally connected apparatus from any one of the already connected apparatuses among said plurality of image processing apparatuses, have the additionally connected apparatus store the registered user information received by said additionally connected apparatus in the user data storage portion of the additionally connected apparatus, and a user data generating portion to, when the additionally connected apparatus acquires the registered user information stored in each of said plurality of image processing apparatuses, have the additionally connected apparatus store the registered user information in the user data storage portion of the additionally connected apparatus, together with the associated apparatus identification information for identifying the image processing apparatus associated with the registered user information, so that the additionally connected apparatus has said user data in common among the group of said plurality of image processing apparatuses.

15. The image processing apparatus according to claim 14, wherein:

said additionally connected apparatus further includes an allowance requesting portion to, in a case where said registered user information corresponding to the apparatus identification information for said additionally connected apparatus is received from any one of already connected apparatuses among said plurality of image processing apparatuses, request allowance for storing the received registered user information into the storage device, wherein said registered user information generating portion, on a condition that an allowance is accepted by said allowance accepting portion, stores said received registered user information into said storage device.

16. The image processing apparatus of claim 15, wherein said allowance requesting portion includes a display portion to display a screen for allowance of storing the received registered user information to the storage portion.

17. A terminal registering method executed in an image processing system including a plurality of image processing apparatuses connected to a network, comprising the steps of:

storing in a user data storage portion registered user information at least including authentication information for authenticating each user for whom the image processing apparatus in which the registered user information is stored is a home terminal;

by storing user data including registered user information stored in each of said plurality of image processing apparatuses connected to the network and apparatus identification information for identifying the image processing apparatus, in association with each other, having said user data in common among said plurality of image processing apparatuses;

obtaining apparatus identification information for identifying an additionally connected apparatus which is additionally connected to the network;

determining whether user data including said obtained apparatus identification information is stored in the user data storage portion or not;

transmitting the registered user information associated with the obtained apparatus identification information to the additionally connected apparatus, when it is determined that the user data including the obtained apparatus identification information is stored in the user data storage portion;

requesting transmission of the registered user information to said additionally connected apparatus, when said step of determining determines that the user data including the obtained apparatus identification information is not stored in the user data storage portion; and by additionally storing in said user data storage portion user data associated with the received registered user information and the apparatus identification information of the additionally connected apparatus in response to reception of the registered user information transmitted by said additionally connected apparatus upon request in said transmitting step, having said user data in common among a group of said plurality of image processing apparatuses with said additionally connected apparatus added.

\* \* \* \* \*